(12) United States Patent
Luley et al.

(10) Patent No.: US 10,493,391 B2
(45) Date of Patent: Dec. 3, 2019

(54) FILTER MODULE WITH A FILTER ELEMENT AND WITH A FASTENING FRAME AND AIR FILTER DEVICE WITH A FILTER MODULE

(71) Applicant: MANN+HUMMEL GMBH, Ludwigsburg (DE)

(72) Inventors: Oliver Luley, Speyer (DE); Andreas Kloss, Mannheim-Seckenheim (DE); Dennis Stark, Mauer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 175 days.

(21) Appl. No.: 15/481,717

(22) Filed: Apr. 7, 2017

(65) Prior Publication Data
US 2017/0291128 A1    Oct. 12, 2017

(30) Foreign Application Priority Data

Apr. 8, 2016   (DE) .................. 10 2016 004 063

(51) Int. Cl.
*B01D 46/00*   (2006.01)
*B01D 46/10*   (2006.01)
*B01D 46/42*   (2006.01)
*F02M 35/02*   (2006.01)

(52) U.S. Cl.
CPC ..... *B01D 46/0004* (2013.01); *B01D 46/0005* (2013.01); *B01D 46/10* (2013.01); *B01D 46/00* (2013.01); *B01D 46/42* (2013.01); *B01D 2265/028* (2013.01); *B01D 2271/022* (2013.01); *B01D 2271/027* (2013.01); *F02M 35/02* (2013.01)

(58) Field of Classification Search
None
See application file for complete search history.

(56) References Cited

U.S. PATENT DOCUMENTS

| 5,100,445 | A | * | 3/1992 | Johnson | B01D 46/10 55/413 |
| 5,472,380 | A | * | 12/1995 | Sarazen, Jr. | F24F 13/075 454/290 |
| 6,231,630 | B1 | * | 5/2001 | Ernst | B01D 46/0005 55/385.3 |
| 6,866,578 | B2 | * | 3/2005 | Orendorff | F24F 13/082 137/625.48 |
| 7,294,161 | B2 | * | 11/2007 | Connor | B01D 46/0005 210/DIG. 17 |
| 7,691,165 | B1 | * | 4/2010 | Hammes | B01D 46/0002 210/435 |

(Continued)

*Primary Examiner* — Bobby Ramdhanie
*Assistant Examiner* — Brit E. Anbacht
(74) *Attorney, Agent, or Firm* — James Hasselbeck

(57) ABSTRACT

A filter module for filtering a fluid is provided with a filter element that has a filter bellows of a filter medium. A fastening frame is connected to the filter element and has a frame wall enclosing circumferentially at least partially a rim of the filter element. A circumferentially extending first sealing element is arranged on an exterior side of the frame wall. The fastening frame has at least one locking element on an exterior side. A second sealing element seals the raw side and the clean side relative to each other, and can be guided into a sealing position upon locking at least one locking element in the installation position.

13 Claims, 5 Drawing Sheets

(56) References Cited

U.S. PATENT DOCUMENTS

| | | | |
|---|---|---|---|
| 7,950,988 B2* | 5/2011 | Demster | F24F 13/06 454/284 |
| 2004/0020177 A1* | 2/2004 | Ota | B01D 46/0006 55/481 |
| 2006/0021932 A1 | 2/2006 | Darnell et al. | |
| 2008/0022641 A1* | 1/2008 | Engelland | B01D 46/0004 55/521 |
| 2008/0110146 A1* | 5/2008 | Germain | B01D 46/0005 55/385.3 |
| 2008/0216455 A1* | 9/2008 | Aizawa | B01D 46/0006 55/481 |
| 2012/0129445 A1* | 5/2012 | Gleason | F24F 13/08 454/322 |
| 2013/0125520 A1* | 5/2013 | Gorman | B01D 46/0002 55/509 |
| 2014/0034565 A1* | 2/2014 | Loken | B01D 46/125 210/232 |
| 2016/0216001 A1* | 7/2016 | Szarek | B01D 46/10 |

\* cited by examiner

FILTER MODULE WITH A FILTER ELEMENT AND WITH A FASTENING FRAME AND AIR FILTER DEVICE WITH A FILTER MODULE

BACKGROUND OF THE INVENTION

The invention concerns a filter module with a filter element for filtering a fluid and with a fastening frame as well as an air filter device with a filter module, in particular for interior air filtration, in particular of a vehicle.

A filter element, used, for example, as a motor vehicle interior air filter or a filter element for a motor vehicle air-conditioning device, serves for filtering by means of a suitable filter the air introduced from outside into the interior of the vehicle and processed. In this context, for example, particle or odor filters are used, or combinations thereof, which filter the particles contained in the air and inherent odors from the ambient air. The efficiency of a filter or of such a filter system depends in this context also on whether the filter system is mounted in the correct position in the filter housing or in a correlated filter receptacle of the filter housing.

DE 10 2013 020 382 Al discloses a filter element with a filter medium and with a frame for fastening the filter element on or in a filter housing, wherein the frame comprises locking elements with which the frame together with the filter element can be locked in the housing.

SUMMARY OF THE INVENTION

An object of the invention is to provide a filter module with a fastening frame and a filter element for filtering a fluid, in particular for air filtration, in particular for interior air filtration, that makes it possible to insert the filter element reliably seal-tightly in an air filter device and to remove it again therefrom.

A further object is to provide an air filter device for filtering a fluid configured for receiving such an exchangeable filter module.

The aforementioned object is solved according to one aspect of the invention by a filter module for filtering a fluid, comprising at least one filter element and a fastening frame connected preferably fixedly to the filter element and comprising a circumferentially extending first sealing element which is arranged on an exterior side of the frame wall of the fastening frame, wherein the fastening frame comprises on its exterior side at least one locking element, and wherein a second sealing element for sealing between raw side and clean side is arranged on the filter element or on the fastening frame, wherein the second sealing element is guided into its sealing position upon locking of the at least one locking element.

According to another aspect of the invention, the further object is solved by an air filter device that is provided for receiving such an exchangeable filter element.

Beneficial configurations and advantages of the invention result from the further claims, the description, and the drawing.

A filter module for filtering a fluid is proposed, comprising: at least one filter element with a filter bellows of a filter medium with a designated raw side and a designated clean side oppositely positioned thereto; a fastening frame that is connected to the filter element and that encloses circumferentially with a frame wall at least partially a rim of the filter element; a circumferentially extending first sealing element which is arranged on an exterior side of the frame wall of the fastening frame, wherein the fastening frame comprises at least one locking element on its exterior side; a second sealing element for sealing between raw side and clean side arranged on the filter element and, upon locking of the at least one locking element, the second sealing element is guidable into its sealing position.

Since the fastening frame comprises two sealing elements, the filter module can compensate component tolerances upon installation in an air filter device and, at the same time, can seal the raw side of the filter element relative to the clean side. In this context, the first sealing element on the fastening frame serves for tolerance compensation as well as a vibration-resistant fastening in its installation position in an air filter device, while the second sealing element is provided for sealing raw side relative to clean side. The filter module can be locked at its installation position and sealed at the same time. The filter module can be locked directly with a sheet metal component of the air filter device. For example, the first sealing element can be a foam material.

The filter bellows is preferably a flat filter bellows, i.e., the filter bellows has flat inflow and outflow surfaces parallel to each other at the raw side and the clean side that are formed by the fold edges at the inflow and outflow sides. The flow is realized in this context substantially perpendicular to the inflow and outflow surfaces. The fastening frame encloses in this context the inflow and outflow surfaces and/or the raw side and the clean side of the filter bellows.

The at least one locking element can preferably be arranged within the first sealing element, i.e., viewed perpendicular to the flow direction between filter bellows and the first sealing element.

The first sealing element is preferably an axial sealing element. Axial is to be understood as a direction that is parallel to the installation direction. In the present case, the installation direction for the preferred embodiments corresponds to the flow direction of the filter element, in particular of the flat filter bellows. Accordingly, the first sealing element is preferably designed to seal in axial direction, i.e., preferably in the installation direction or in the flow direction and/or perpendicular to the inflow and outflow surfaces, i.e., to be seal-tightly contacting and elastically deformable in axial direction. The first sealing element is compressed axially in this context by the movement of the filter element or of the filter module.

The second sealing element is preferably a radial sealing element. Radial is to be understood as a direction which is extending in a plane perpendicular to the installation direction. Accordingly, the second sealing element is preferably designed to seal in radial direction, i.e., preferably perpendicular to the installation direction or to the flow direction and/or parallel to the inflow and outflow surfaces, i.e., to be seal-tightly contacting and elastically deformable in radial direction. In relation to a radial sealing seat, the second sealing element is configured with oversize so that in particular an elastic deformation perpendicular to the installation direction is realized when the second sealing element is transferred into the sealing position. A radial sealing element is independent of the axial position so that installation tolerances can be compensated that particularly occur to a greater extent when the contact surfaces of the first and second sealing element are arranged on different counterparts which have a positional tolerance relative to each other.

In this context, but also independent of the aforementioned features, it is in particular advantageous when the second sealing element is arranged on the side of the at least one locking element facing away from the first sealing element and preferably at a spacing therefrom. Also, independent of the aforementioned features, it is also particularly advantageous when the second sealing element does not project past the locking elements in order not to collide upon installation with the corresponding locking devices of a housing, in particular the edge of an installation opening. In other words, the at least one locking element projects preferably past the second sealing device in radial direction. Based on this, it is further advantageous to position radially inwardly relative to the installation opening a housing-associated sealing seat for contacting the second sealing device, i.e., to make it smaller than the installation opening.

According to a beneficial configuration, on the fastening frame of the filter module at least one grab handle can be provided with which the at least one locking element is releasable for removal from an installation position in that the fastening frame is removable from the installation position by the grab handle. By means of the grab handle, the filter module can be guided into its installation position in an air filter device and can be locked therein and can be removed again from the installation position. Because the locking action of the filter module at its installation position can be released by means of the grab handle and not at the at least one locking element itself, the first sealing element can be circumferentially closed on the frame wall of the fastening frame and must not be interrupted at the locking element, or the locking elements should there be a plurality of locking elements provided. This simplifies the installation and removal of the filter module. Advantageously, a plurality of locking elements can be provided on the frame wall.

According to a beneficial configuration, the fastening frame can be glued to the filter element. For example, a polyurethane adhesive or the like is advantageous. The filter element can be preassembled with the fastening frame and can be exchanged together with the fastening frame. In this context, it is important and preferred that the filter element is fixedly connected with the fastening frame, i.e., captively and preferably seal-tightly connected with the fastening frame, so that they are mountable and removable position-independently as a unit and the filter element cannot, in particular not in the installation direction and/or flow direction, drop out of the fastening frame.

According to a beneficial configuration, the frame wall can be designed as a double wall, comprising a closed inner wall and the exterior side as an outer wall with the at least one locking element. Advantageously, the inner wall of the frame wall can rest circumferentially seal-tightly against the sides of the filter element while the outer wall can be interrupted suitably for the at least one locking element or for a plurality of locking elements.

According to a beneficial configuration, the at least one locking element can comprise a locking nose with two slanted surfaces oppositely positioned in axial direction; the locking nose is arranged on a flexible tab in the exterior side of the frame wall. Beneficially, a slant of the slanted surfaces oppositely positioned in axial direction can be selected such that with one slanted surface a reliable locking action of the locking element or locking elements and with the other oppositely positioned slanted surface a release of the locking action is possible when the filter module is pulled by means of the grab handle of the fastening frame from its installation position. Advantageously, the two slanted surfaces each are positioned relative to the frame wall at an angle of at most 90°, preferably of at most 85°, particularly preferred of at most 80°. Advantageously, the angle is selected such that a safe locking action is possible. A removal force for removing the filter module and an installation force for installing the filter module depend respectively on the number of locking elements, on a slant angle of the corresponding slanted surface relative to the frame wall, on the width of the locking elements, and on the thickness of the locking element. For the respective intended use, the elements can be appropriately matched to the desired forces.

According to a beneficial configuration, the frame wall with its bottom edge can be spaced at a spacing from a top edge of the second sealing element. This provides for compensation of component tolerances.

According to a beneficial configuration, on lateral end faces that are surrounding the filter bellows a flatly applied lateral band can be arranged so as to extend circumferentially, wherein, further preferred, on an exterior side of the lateral band the second sealing element is arranged as a circumferentially extending sealing ring and wherein the lateral band comprises a tab which is projecting past the clean side of the filter bellows; at the end faces, said tab is arranged folded back in a V-shape over the second sealing element. The tab serves advantageously for centering the filter module and as an insertion aid for the second sealing element into its sealing seat in the installation position. Advantageously, a part of the lateral band, which is arranged for lateral sealing of the filter bellows, in particular in case of a zigzag shaped folded filter medium, is projecting past a bottom edge of the filter bellows delimiting the clean side and can be folded back and, in this way, the part of the lateral band can project in a V-shape relative to the lateral band fastened to the end faces and can partially project past the sealing element. Upon insertion into a sealing seat, for example, of a filter housing or the like, this V-shaped tab can be pressed against the sealing element and at least partially can be clamped between sealing element and sealing seat so that the tab is thus fixedly secured at the sealing seat. In this way, for the combination of the V-shaped folded tab and the sealing element a sealing action of the filter module upon installation in an installation position is effected by the tab as well as by the sealing element. In this way, a simplified insertion of the filter module into a filter housing or the like is possible so that the force expenditure for insertion of the filter module into its installation position is reduced.

The second sealing element that can be comprised, for example, of foam rubber or cellular rubber and that can be embodied as a rectangular profile is expediently glued to the lateral band. For this purpose, the sealing element can comprise an adhesive layer with which it can be glued to the lateral band. Alternatively, the sealing element can also be applied directly as a sealing medium bead onto the lateral band. Since the cross section (width/length) of the filter element of the filter module is expediently selected to be greater than the cross section of the sealing seat in the installation position, an oversize is created and the sealing element is compressed upon insertion of the filter module into the sealing seat. Due to the overlap of the tab with the sealing element, the sealing element is pre-compressed and the compression upon insertion of the filter module into the sealing seat is achieved without detachment of the sealing element.

According to a beneficial configuration, the tab can cover the second sealing element at least partially at an exterior side. In this way, it is ensured that, upon insertion of the filter module into a sealing seat, the tab is clamped between sealing element and wall of the sealing seat and, in this way, the insertion of the filter module by a pre-compression of the sealing element is facilitated and an additional sealing action by means of the tab can be realized.

According to a further aspect of the invention, an air filter device is proposed, in particular an interior air filter device, in particular of a vehicle, comprising a filter module according to the invention and a clean air channel, wherein the filter module is exchangeably arranged in an installation position and said filter module comprises a filter element in a fastening frame. Advantageously, the filter module can be locked with at least one locking element on its frame wall directly with a sheet metal component and can be released again easily from its installation position.

According to a beneficial configuration, the filter module can provide a tolerance compensation upon installation in its installation position. An additional component for tolerance compensation is not required.

According to a beneficial configuration, in the installed state of the filter module a first sealing element can rest seal-tightly against a sheet metal frame when at least one locking element is resting against the fastening frame and, at the same time, a second sealing element on the filter element for sealing raw side relative to clean side is sealingly resting against a sealing seat of an air inlet.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to meaningful further combinations.

DESCRIPTION OF PREFERRED EMBODIMENTS

Figure 1:
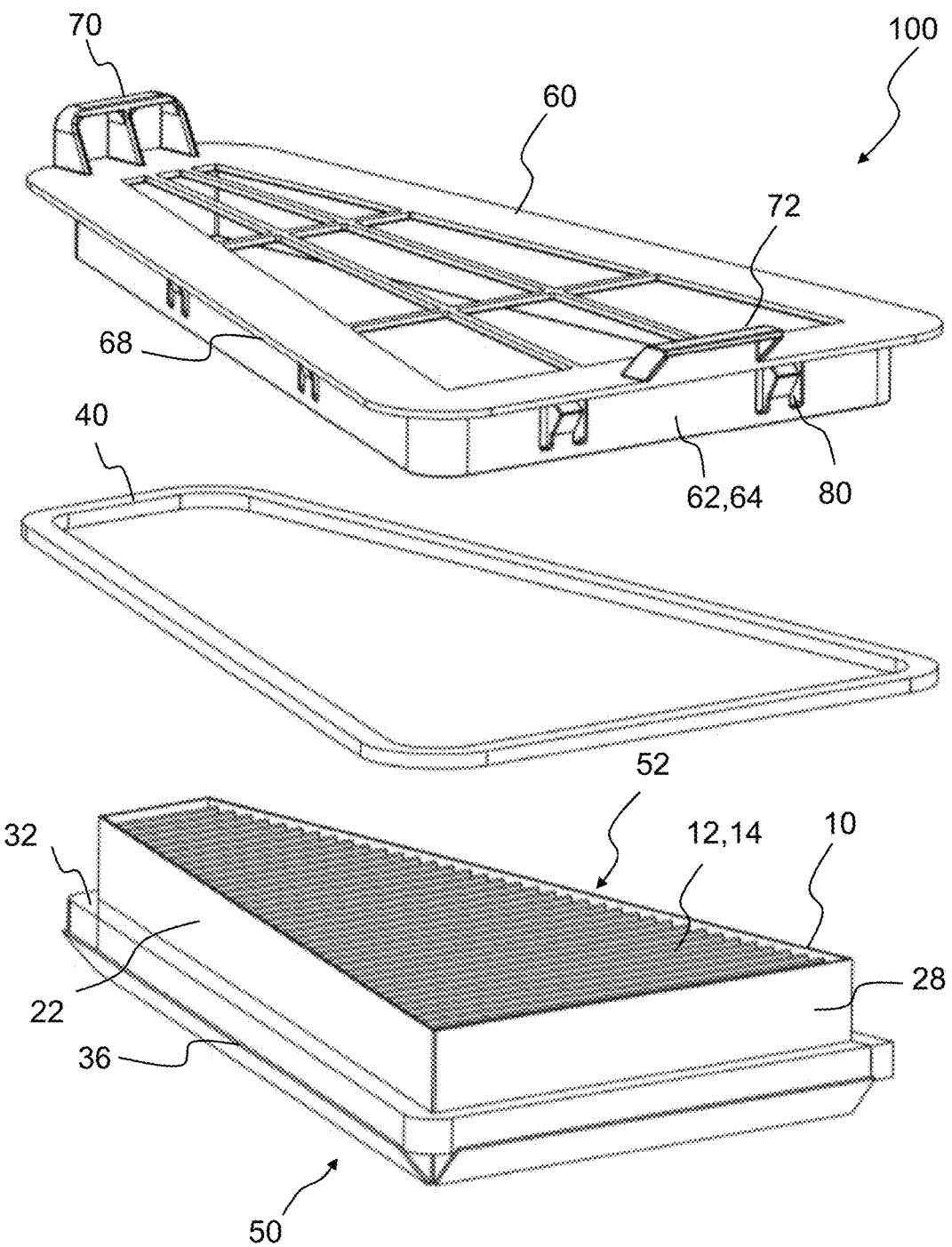
FIG. 1 shows an exploded illustration of a filter module with fastening frame and filter element according to an embodiment of the invention in isometric illustration.

In the Figures, same components or components of the same kind are identified with same reference characters. The Figures show only examples and are not to be understood as limiting.

Figure 2:
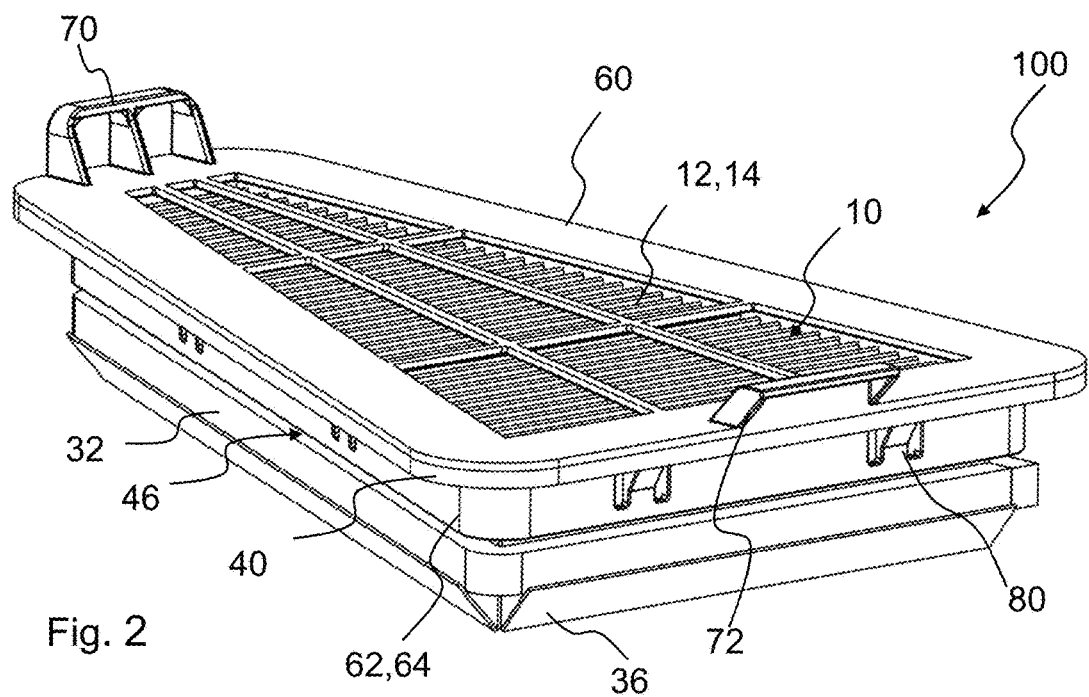
FIG. 2 shows the filter module according to FIG. 1 in assembled state in isometric illustration.

FIG. 1 shows an exploded illustration of a filter module 100 for filtering a fluid with a filter element 10 and with a fastening frame 60 according to an embodiment of the invention in isometric illustration. FIG. 2 shows the filter module 100 in the assembled state for installation in its installation position. The filter module 100 comprises a filter element 10 with a filter bellows 12 of a filter medium 14 with a designated raw side 52 and a designated clean side 50 oppositely positioned thereto.

The fastening frame 60 is fixedly connected to the filter element 10, for example by gluing, and encloses circumferentially a rim 22 of the filter element 10 with a frame wall 62. On its topside which forms the raw air side of the filter module 100, the fastening frame 60 comprises a circumferentially extending projecting rim 68 from which the frame wall 62 is axially projecting. Within the rim 68, the fastening frame 60 comprises a grid with coarse grid pattern that in the installed state covers the filter element 10.

A circumferentially extending first sealing element 40 is arranged on an exterior side 64 of the frame wall 62 of the fastening frame 60 below the rim 68.

The fastening frame 60 comprises on its exterior side 64 a plurality of locking elements 80. The rim 68 projects past the locking elements 80. The rim 68 is provided for resting against an installation opening, for example, in a fitting panel, of the filter module 100. The locking elements 80 are covered in the final installation position.

On the fastening frame 60, a grab handle 70 is provided with which the locking elements 80 are releasable for removal from an installation position in that the fastening frame 60 can be removed from the installation position by the grab handle 70. For simplified handling, a further grip element 72 can be provided which can be arranged on a side of the fastening frame 60 opposite the grab handle 70. The fastening frame 60 has a trapezoidal cross section wherein the grab handle 70 is arranged on the smallest side of the trapezoidal cross section so that the filter module 70 can be pulled out easily from the installation position.

The filter element 10 comprises a flat filter bellows 12 of a filter medium 14 with a designated raw side 52 and a designated clean side 50 positioned opposite the raw side 52. The filter bellows 12 comprises upright folds in such a way that fold edges are positioned in the clean side surface and in the raw side surface of the filter element 10, respectively. The lateral end faces of the filter element 10 are sealed by a circumferentially extending lateral band 28.

On the exterior side of the lateral band 28, a circumferentially extending second sealing element 32 is arranged. The lateral band 28 comprises a tab 36 which is projecting past the clean side 50 of the filter bellows 12; at the lateral end faces, said tab 36 is folded back in a V-shape over the sealing element 32.

The sealing element 32 can be comprised of foam rubber or cellular rubber which has been found to be a particularly beneficial sealing material with suitable elastic properties. The tab 36 covers minimally the sealing element 32 on the exterior side because the tab 36 is configured to extend up to the edge of the sealing element 32 which is facing the clean side 50. For formation of the tab 36, the lateral band 28 on a circumference of the clean side 50 is expediently circumferentially cut or stamped in order to thus be able to fold back the tab reliably.

The lateral band 28 and the tab 36 comprise a nonwoven or a similar textile fabric because these materials provide good sealing action and can be easily processed.

In the assembled state (FIG. 2), the fastening frame 60 is connected to the filter element 10 wherein between the bottom edge of the frame wall 62 and the top edge of the second sealing element 32 a spacing 46 is formed which enables compensation of component tolerances in axial direction upon installation in an installation position of the filter module 100.

Figure 3:
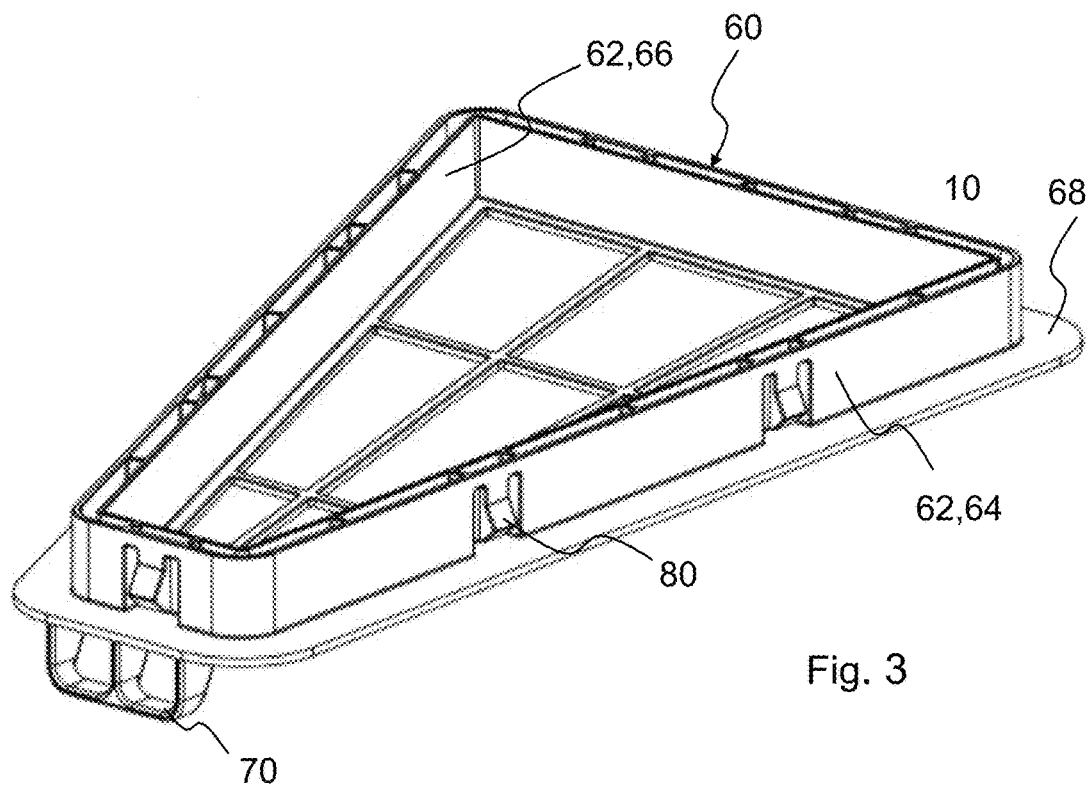
FIG. 3 shows the fastening frame of the filter module according to FIG. 1 in a view of its bottom side.

FIG. 3 shows a bottom view of the fastening frame 60 of the filter module 100 according to FIG. 1. The frame wall 62 is designed as a double wall and comprises an outer wall as exterior side 64 and an inner wall 66. The inner wall 66 is closed while the outer wall is interrupted by the locking elements 80, in this example seven locking elements 80, which are arranged in distribution on the circumference of the frame wall 62.

Figure 4:
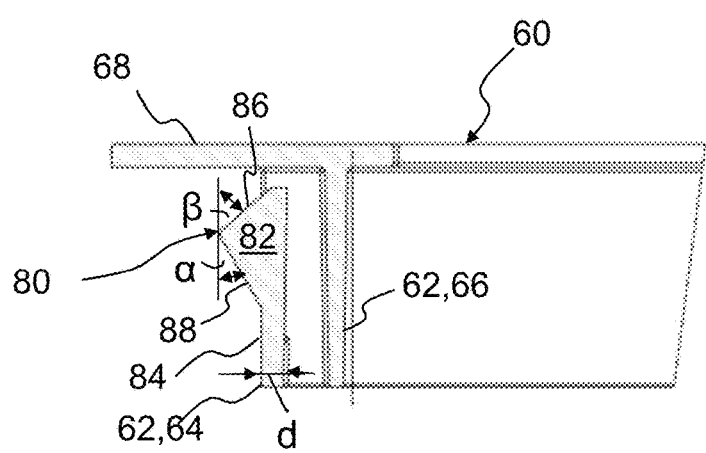
FIG. 4 is a detail view of a locking element of the fastening frame of FIG. 1.

FIG. 4 shows a detail view of a locking element 80 of the fastening frame 60 of FIG. 1. The locking element 80 comprises a locking nose 82 with two slanted surfaces 86, 88 which are arranged on a flexible tab 84 in the exterior side 64 (outer wall) of the frame wall 62. The upper slanted surface 86 is positioned at an angle β relative to the axial direction perpendicular to the rim 68 of the fastening frame 60. The angle β determines together with the number of locking elements 80, their width, and the thickness d of the tab 84 the removal force for the filter module 100 for removal of the filter module 100 from its installation position.

The lower slanted surface 88 is positioned at an angle α relative to the axial direction. The angle α determines together with the number of the locking elements 80, their width, and the thickness d of the tab 84 the mounting force for insertion of the filter module 100 into its installation position.

Figure 5:
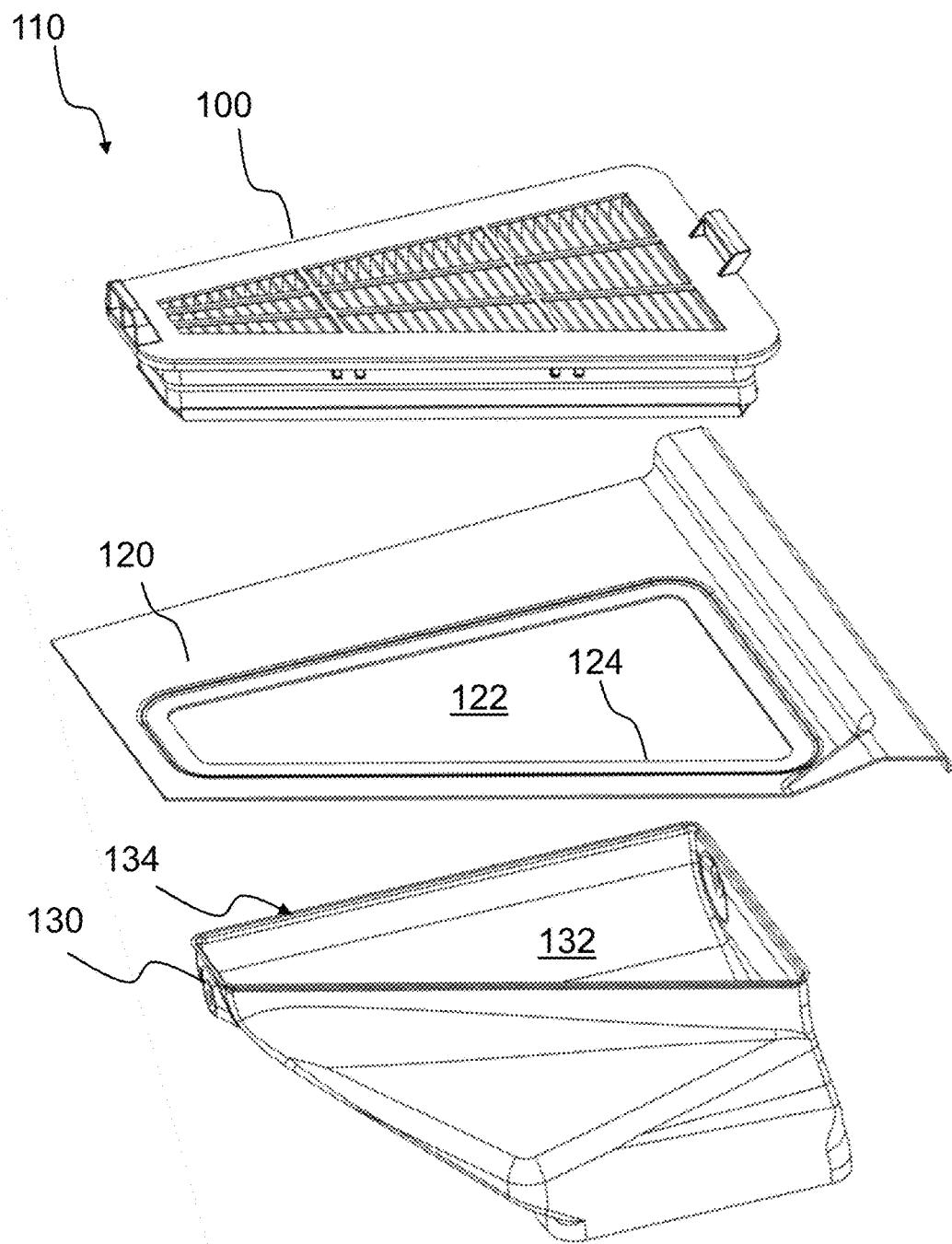
FIG. 5 shows in exploded illustration the filter module of FIG. 1 on an air filter device.
Figure 7:
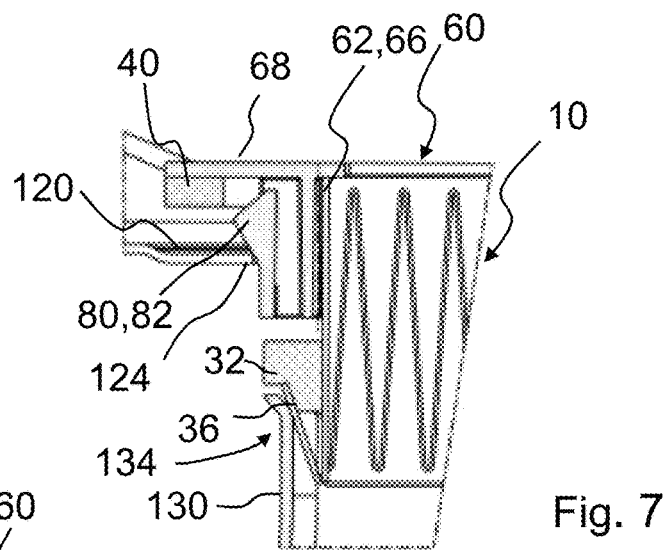
FIG. 7 illustrates a second stage of the insertion of the filter module of FIG. 1 into its installation position in a detail view.
Figure 8:
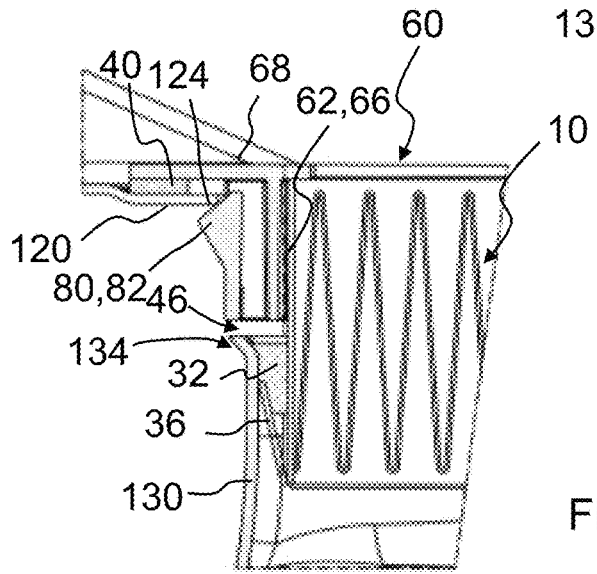
FIG. 8 illustrates a third stage of the insertion of the filter module of FIG. 1 into its installation position in a detail view.

FIG. 5 shows in an exploded view a filter module 100 and a detail of an air filter device 110 with fitting panel 120 and clean air channel (clean air supply) 130 into which the filter module 100 is to be inserted. The FIGS. 6 to 8 illustrate based on detail views different stages when inserting the filter module 100 of FIG. 1 into its installation position in the air filter device 110.

The fitting panel 120 of the air filter device 110 comprises an opening 122 with a downwardly stepped edge 124 against which the first sealing element 40 of the filter module 100 is to be resting. A clean air channel 130 formed as a hose comprises a sealing seat 134 for the second filter element 32 of the filter module 100. The clean air channel 130 is secured with a fastening element (not illustrated) on the fitting panel 120 and is spaced apart from the latter with its air inlet opening 132.

Figure 6:
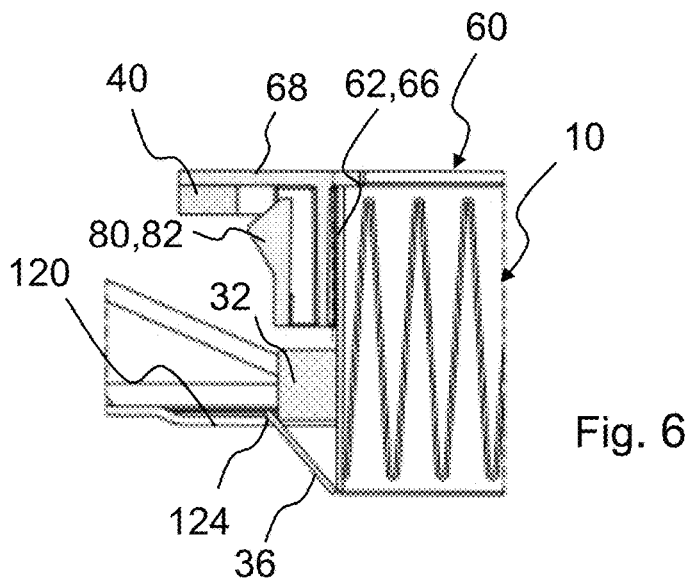
FIG. 6 illustrates a first stage of the insertion of the filter module of FIG. 1 into its installation position in a detail view.

First, the filter module 100, with its clean air side end with the second sealing element 32 leading, is inserted into the opening 122 past the edge 124 (FIG. 6). The V-shaped tab 36 on the bottom side of the filter module 100 serves in this context as an insertion aid.

Upon further insertion of the filter module 100, the respective locking element 80 with its locking nose 82 contacts the edge 124 of the fitting panel 120 (FIG. 7) and is deflected in accordance with its insertion ramp (slanted surface 88, FIG. 4) elastically toward the inner wall 66 of the frame wall 62 of the fastening frame 60. In this way, the filter module 100 can be inserted farther into the opening 122 of the fitting panel 120. In this context, the bottom end of the filter module 100 contacts the air inlet opening 132 of the clean air channel 130 and is centered by means of the V-shaped folded tabs 36 which serve also as insertion aid for the second sealing element 32 into the sealing seat 134. The tabs 36 effect a compression of the second sealing element 32 so that the latter can glide safely into the sealing seat 134.

Upon further insertion of the filter element 100, the locking nose 82 snaps into place below the edge 124 of the fitting panel 120 while the second sealing element 32 glides farther into the sealing seat 134 of the clean air channel 130 and seal-tightly closes off the clean air channel 130 (FIG. 8). The first sealing element 40 is clamped between the rim 68 of the fastening frame and the fitting panel 120 and, in this way, can generate a pretension so that the filter module 100 is secured vibration-resistant in its final installation position.

While specific embodiments of the invention have been shown and described in detail to illustrate the inventive principles, it will be understood that the invention may be embodied otherwise without departing from such principles.

What is claimed is:

1. A filter module for filtering a fluid, the filter module comprising:
    at least one filter element comprising a filter bellows comprised of a filter medium having a raw flow face on a designated raw side and a clean flow face on a designated clean side oppositely positioned relative to the designated raw side, the filter element having lateral sides which surround the filter element, the lateral sides extending from the raw flow face to the clean flow face of the filter bellows;
    wherein an axial direction, as used herein, is a direction from the raw flow face to the clean flow face;
    wherein a radial direction, as used herein, is a direction traverse to the axial direction;
    a fastening frame connected to the at least one filter element, the fastening frame comprising:
        a grid which is arranged on and arranged parallel to a directly adjacent flow face, being either the raw flow face or the clean flow face, the grid forming a plurality of flow openings in flow communication with the directly adjacent flow face;
        wherein the grid has a radially outwardly projecting flange connected to radially outer edges of the grid, the radially outwardly projecting flange framing and circumferentially surrounding the grid, the radially outwardly projecting flange aligned parallel to and projecting radially outwards from the grid, forming a radially outwardly projecting flange of the fastening frame;
        an axially projecting frame wall formed on an underside of the radially outwardly projecting flange, the axially projecting frame wall circumferentially surrounding the filter bellows on the lateral sides;
    a circumferentially extending first sealing element arranged on an exterior side of the axially projecting frame wall and arranged on the underside of the radially outwardly projecting flange;
    the fastening frame comprising at least one locking element on an exterior side of the axially projecting frame wall, underneath the radially outwardly projecting flange;
    a second sealing element configured to seal the raw side and the clean side relative to each other, wherein the second sealing element is arranged on the at least one filter element at the lateral sides and positioned such that the at least one locking element is arranged between the second sealing element and the radially outwardly projecting flange;
    the second sealing element configured to be guided into a sealing position upon locking of the at least one locking element in an installation position of the filter module.

2. The filter module according to claim 1, further comprising
    at least one grab handle arranged on the radially outwardly projecting flange of the fastening frame,
    wherein the at least one locking element is releasable for removal of the fastening frame from the installation position in that the fastening frame is removed from the installation position by the grab handle.

3. The filter module according to claim 1, wherein
    the fastening frame is fixedly connected to the at least one filter element.

4. The filter module according to claim 3, wherein
the fastening frame is glued to the at least one filter element.

5. The filter module according to claim 1, wherein
the axially projecting frame wall is a double wall comprising a closed inner wall and an outer wall forming the exterior side of the axially extending frame wall provided with the at least one locking element.

6. The filter module according to claim 1, wherein
the at least one locking element comprises a locking nose comprising a first slanted surface and a second slanted surface positioned oppositely relative to the first slanted surface in the axial direction of the fastening frame,
wherein the locking nose is arranged on a flexible tab arranged in the exterior side of the axially extending frame wall.

7. The filter module according to claim 1, wherein
the axially extending frame wall has a top edge where the axially extending frame wall connects to the radially outwardly projecting flange, and a bottom edge, wherein the axially extending frame wall is spaced apart at a spacing from a top edge of the second sealing element.

8. The filter module according to claim 1, wherein the first sealing element is an axial sealing element and the second sealing element is a radial sealing element.

9. The filter module according to claim 1, further comprising
a lateral band that is flatly applied circumferentially to lateral end faces of the filter bellows,
wherein the lateral band comprises an exterior side and the second sealing element is arranged on the exterior side of the lateral band so as to extend circumferentially about the filter bellows,
wherein the lateral band extends axially outwardly beyond the clean side filter bellows, an outwardly extending portion of the lateral band forming a tab projecting past the clean side of the filter bellows,
wherein the tab is folded back in a V-shape toward the second sealing element.

10. The filter module according to claim 9, wherein
the tab at least partially covers an exterior side of the second sealing element.

11. An air filter device comprising:
a clean air supply;
a filter module for filtering a fluid, the filter module comprising:
at least one filter element comprising a filter bellows comprised of a filter medium having a raw flow face on a designated raw side and a clean flow face on a designated clean side oppositely positioned relative to the designated raw side, the filter element having lateral sides which surround the filter element, the lateral sides extending from the raw flow face to the clean flow face of the filter bellows;
wherein an axial direction, as used herein, is a direction from the raw flow face to the clean flow face;
wherein a radial direction, as used herein, is a direction traverse to the axial direction;
a fastening frame connected to the at least one filter element, the fastening frame comprising:
a grid which is arranged on and arranged parallel to a directly adjacent flow face, being either the raw flow face or the clean flow face, the grid forming a plurality of flow openings in flow communication with the directly adjacent flow face;
wherein the grid has a radially outwardly projecting flange connected to radially outer edges of the grid, the radially outwardly projecting flange framing and circumferentially surrounding the grid, the radially outwardly projecting flange aligned parallel to and projecting radially outwards from the grid, forming a radially outwardly projecting flange of the fastening frame;
an axially projecting frame wall formed on an underside of the radially outwardly projecting flange, the axially projecting frame wall circumferentially surrounding the filter bellows on the lateral sides;
a circumferentially extending first sealing element arranged on an exterior side of the axially projecting frame wall and arranged on the underside of the radially outwardly projecting flange;
the fastening frame comprising at least one locking element on an exterior side of the axially projecting frame wall, underneath the radially outwardly projecting flange;
a second sealing element configured to seal the raw side and the clean side relative to each other, wherein the second sealing element is arranged on the at least one filter element at the lateral sides and positioned such that the at least one locking element is arranged between the second sealing element and the radially outwardly projecting flange;
the second sealing element configured to be guided into a sealing position upon locking of the at least one locking element in an installation position of the filter module on the clean air supply;
wherein the filter module is arranged exchangeably in the installation position on the clean air supply.

12. The air filter device according to claim 11, wherein
the filter module provides a tolerance compensation when installed in the installation position, the tolerance compensation provided by an axial spacing or gap between the axially extending frame wall and the second sealing element.

13. The air filter device according to claim 11, wherein, in the installation position, the first sealing element is sealtightly resting against a sheet metal frame of the air filter device when the at least one locking element on the fastening frame engages the sheet metal frame and, at the same time, the second sealing element sealingly rests on a sealing seat of an air inlet of the clean air supply.

* * * * *